(12) United States Patent
Lehmann (10) Patent No.: US 11,994,414 B2
(45) Date of Patent: May 28, 2024

(54) TRANSFORMER WITH TEST CIRCUIT

(71) Applicant: Continental Teves AG & Co. oHG, Frankfurt am Main (DE)

(72) Inventor: Sören Lehmann, Frankfurt am Main (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 544 days.

(21) Appl. No.: 17/268,671

(22) PCT Filed: Jul. 17, 2019

(86) PCT No.: PCT/EP2019/069174
§ 371 (c)(1),
(2) Date: Feb. 16, 2021

(87) PCT Pub. No.: WO2020/035250
PCT Pub. Date: Feb. 20, 2020

(65) Prior Publication Data
US 2021/0190546 A1    Jun. 24, 2021

(30) Foreign Application Priority Data
Aug. 16, 2018 (DE) ..................... 10 2018 213 783.8

(51) Int. Cl.
| | |
|---|---|
| *G01R 15/18* | (2006.01) |
| *G01D 5/22* | (2006.01) |
| *G01D 18/00* | (2006.01) |
| *H01F 21/06* | (2006.01) |
| *H01F 27/29* | (2006.01) |

(52) U.S. Cl.
CPC ........... *G01D 5/2291* (2013.01); *G01D 18/00* (2013.01); *H01F 21/06* (2013.01); *H01F 27/29* (2013.01)

(58) Field of Classification Search
CPC ............................ G01D 18/00; G01D 5/2291
See application file for complete search history.

(56) References Cited

U.S. PATENT DOCUMENTS

| 4,774,465 A | 9/1988 | Nilius |
|---|---|---|
| 5,777,468 A | 7/1998 | Maher |
| (Continued) | | |

FOREIGN PATENT DOCUMENTS

| DE | 4425903 | 3/1997 |
|---|---|---|
| DE | 102012215940 A1 | 3/2013 |
| (Continued) | | |

OTHER PUBLICATIONS

Chinese Office Action for Chinese Application No. 201980053737.0, dated Mar. 28, 2022 with translation, 19 pages.
(Continued)

*Primary Examiner* — Alesa Allgood
(74) *Attorney, Agent, or Firm* — BUCHANAN INGERSOLL & ROONEY PC (57) ABSTRACT

A transformer including a primary circuit with a primary inductor, a first secondary circuit with a first secondary inductor that is galvanically isolated from the primary inductor and coupled to the primary inductor, a second secondary circuit with a second secondary inductor that is galvanically isolated from the primary inductor and coupled to the primary inductor. The second secondary inductor is implemented redundantly with respect to the first secondary inductor, in particular such that the first secondary inductor encloses the second or the second encloses the first. The first and second secondary inductors are connected to one, or each to one, DC voltage source as well as each to a test circuit with a tapping point for tapping off a test voltage.

11 Claims, 9 Drawing Sheets

(56) References Cited

U.S. PATENT DOCUMENTS

| | | | |
|---|---|---|---|
| 8,885,372 B1* | 11/2014 | Nanut | H02M 1/12 |
| | | | 363/69 |
| 9,243,933 B2 | 1/2016 | Lehmann et al. | |
| 10,126,349 B2 | 11/2018 | Lehmann | |
| 2012/0176124 A1 | 7/2012 | Szulyk et al. | |
| 2014/0203801 A1 | 7/2014 | Lehmann et al. | |
| 2016/0209457 A1* | 7/2016 | Lehmann | G01D 18/00 |
| 2017/0222381 A1* | 8/2017 | Shpiro | H02J 3/00 |

FOREIGN PATENT DOCUMENTS

| | | |
|---|---|---|
| DE | 102013219567 A1 | 4/2015 |
| EP | 0238922 | 1/1990 |
| EP | 0768515 A1 | 4/1997 |
| EP | 2975719 A1 | 1/2016 |
| WO | 2012155886 A1 | 11/2012 |
| WO | 2015044307 A1 | 4/2015 |

OTHER PUBLICATIONS

Chinese Office Action for Chinese Application No. 201980053737.0, dated Feb. 3, 2023 with translation, 8 pages.
German Search Report for German Application No. 10 2018 213 783.8, dated Mar. 27, 2019 with partial translation, 12 pages.
International Search Report and Written Opinion for International Application No. PCT/EP2019/069174, dated Sep. 23, 2019. 7 pages.

* cited by examiner

TRANSFORMER WITH TEST CIRCUIT

CROSS REFERENCE TO RELATED APPLICATIONS

This application is the U.S. National Phase Application of PCT International Application No. PCT/EP2019/069174, filed Jul. 17, 2019, which claims priority to German Patent Application No. 10 2018 213 783.8, filed Aug. 16, 2018, the contents of such applications being incorporated by reference herein.

FIELD OF THE INVENTION

The invention relates to a transformer and to a sensor having such a transformer.

BACKGROUND OF THE INVENTION

Transformers are known from DE 44 259 03 C3 and EP 238 922 B1, both incorporated by reference herein, that operate as position sensors using the principle of linear displacement measurement on the basis of a permanent magnetic linear contactless displacement, referred to as PLCD. Position sensors of this sort are also known as linear inductive position sensors, referred to as LIPS.

Such transformers typically comprise a continuous primary winding or primary inductor on a soft-magnetic core. Secondary coils or secondary inductors are arranged at the leg ends of the core. These secondary inductors are in particular also applied redundantly, i.e. arranged on top of each other, in sensors for applications with the highest safety requirements. The primary inductor and the secondary inductor in principle overlap one another, possibly also only partially depending on the design of the transducer, and so in the event of a fault electrical connections can arise that can falsify the result of the measurement. Further incorrect measurement results can arise through a discontinuity in the secondary windings.

Electrical connections or short circuits between the various secondary winding packages, as well as between the primary winding and secondary winding, in particular have higher significance, in particular in displacement or angle sensors with very high safety requirements, such as are, for example, employed for registering the braking request in the electrohydraulic brake, since these frequently manifest as what are known as defects of the same origin. As a consequence of such a defect, the truly redundant mode of operation is no longer present, since the defect of the same origin corrupts both redundant paths of the transformer to a similar or even identical degree. A comparison of the two path signals is consequently no longer useful in such a fault situation.

SUMMARY OF THE INVENTION

Therefore, an aspect of the invention is a transformer or a sensor that permits reliable, or precise, or comprehensive fault detection.

According to one aspect of the invention, a transformer comprises a primary circuit with a primary inductor, a first secondary circuit with a first secondary inductor that is galvanically isolated from the primary inductor and coupled to the primary inductor, a second secondary circuit with a second secondary inductor that is galvanically isolated from the primary inductor and coupled to the primary inductor, wherein the second secondary inductor is implemented redundantly with respect to the first secondary inductor, in particular such that the first secondary inductor encloses the second or the second encloses the first, wherein the first and second secondary inductors are connected to one, or each to one, DC voltage source as well as each to a test circuit with a tapping point for tapping off a test voltage. Various fault states can not only be detected but also distinguished with the aid of the test voltages.

An aspect of the invention is initially based on the recognition that fault states can be made detectable in that specific DC voltage potentials are overlaid on the alternating voltage that is actually transduced, especially as DC voltages do not have an interfering effect on the inductive coupling. However, the fact that short-circuit faults can exclusively only be detected between winding packages that in proper operation or a proper state, which is therefore free of faults, are not galvanically connected, is found to be a fundamental limitation of a diagnostic method based on the comparison of DC voltage potentials.

In the sense of an aspect of the invention, secondary inductors implemented redundantly with respect to one another preferably means that the redundant secondary inductor fulfills the same function as the other secondary inductor, or a pair of redundant secondary inductors fulfill the same function as the other (actual) pair of secondary inductors. Mutually redundant secondary inductors accordingly are positioned in the transformer with almost the same effect, for example wound over or under one another.

The redundant inductors preferably do not share a common base point, so that discrete access to all available terminals of the secondary inductors of the transformer enables detection of and distinction between all possible fault cases of galvanic connections that can occur.

Inasmuch as the first and second secondary inductors are connected to a common DC voltage source, the DC voltage potentials required individually for each secondary inductor are preferably derived from the common voltage source with the aid of voltage dividers.

It is preferred for the respective test circuit to comprise two resistors between which the tapping point is arranged, so that the resistors form a voltage divider, wherein in particular the respective secondary inductor is connected in series between the two resistors. Test voltages result from the voltage dividers at the respective tapping points, which provide information as to whether and how the respective voltage divider has been changed by a galvanic connection or discontinuity, i.e. whether a defective state is present and what kind of defective state is involved. Preferably the test circuits are integrated in the external wiring of the transducer of the transformer.

It is preferred for the resistors to be dimensioned such that the division ratios of the respective voltage dividers are different.

According to a preferred form of embodiment, the transformer comprises a third secondary circuit with a third secondary inductor that is galvanically isolated from the primary inductor and coupled to the primary inductor, and a fourth secondary circuit with a fourth secondary inductor that is galvanically isolated from the primary inductor and coupled to the primary inductor, wherein the fourth secondary inductor is implemented redundantly with respect to the third secondary inductor, in particular such that the third secondary inductor encloses the fourth or the fourth encloses the third, wherein the third and fourth secondary inductors are each connected to a DC voltage source or to the DC voltage source of the first and second secondary inductors, as well as each to a test circuit with a tapping point for tapping off a test voltage. Such an embodiment is, for example, particularly useful for a use of the transformer in a displacement sensor. The scope of the diagnostic possibilities with the transformer according to an aspect of the invention is moreover particularly valuable in connection with this form of embodiment.

Preferably, the secondary inductors each comprise their own connection to a common reference potential or their own ground connection, and each comprise a galvanic isolation therefrom, in particular in the form of a capacitor. The galvanic isolation is preferably provided at the respective winding end, and establishes the respective AC-ground reference point for the induced alternating magnitudes. From the point of view of the alternating voltage, the test circuit is grounded through the galvanic isolation from the ground, so that from the point of view of the alternating voltage, only the respective secondary circuit is present, but not the test circuit. If the galvanic isolation is a capacitor, it is thus helpful if alternating voltages with high frequencies, for example in or above the kHz range, are transduced with the transformer. In this way, a small capacitance can be selected for the capacitor, so that the reactive impedance of the capacitor can be neglected. It is furthermore advantageous if the capacitor is also optimized with respect to the load or input impedance that has an effect on the alternating magnitude.

It is preferred for the primary circuit to comprise a DC voltage source, so that a specific DC voltage potential can be applied to the primary inductor. With respect to the possibility of detecting galvanic connections between arbitrary secondary inductors and the primary inductor, it is particularly advantageous that the primary inductor is at a fixed and known DC voltage potential with defined internal resistance.

The electrical components of the test circuits are preferably dimensioned such that in the presence of different defective states, in particular short-circuits between different combinations of components, the size of the difference between the test voltage in the fault-free state and the test voltage in the presence of a particular one of the various defective states is as large as possible for at least one of the test voltages, making allowance for the respective maximum component tolerances.

According to one advantageous form of embodiment, the transformer comprises an analysis apparatus, for example in the form of a microcontroller, for further processing of the test voltages that is attached to the respective tapping points, wherein the analysis apparatus is configured to compare the respective test voltage with at least one threshold voltage and, depending thereon, to output information as to whether the transformer has a defective state, in particular also as to what type of defective state is involved.

Preferably the tapping points are connected to the analysis apparatus through an analog/digital converter in each case. Since the further processing is performed digitally by the analysis apparatus, the result is an easy adjustment, with long-term stability, of the decision threshold values with regard to distinguishing between defective states and the state that is not defective.

The respective analog/digital converters are preferably connected to the common DC voltage source of the secondary inductors as a reference voltage source. The absolute magnitude of the voltage source, or inaccuracies that occur in the operating voltage, thus become(s) insignificant, since the system as a whole adopts a ratiometric behavior, and the test voltages that are set are practically only determined by the division ratio of the voltage dividers that is set, both in regular and in defective operation.

According to a further aspect of the invention, a sensor comprises a transformer as given, wherein the sensor is designed to register the distance covered by an encoder on the basis of the coupling between the primary inductor and the secondary inductors, wherein the encoder influences the coupling depending on the distance, in particular as a result of local saturation of a soft-magnetic core. Preferably the encoder here reflects the position of the primary piston of a tandem master cylinder of a vehicle brake.

BRIEF DESCRIPTION OF THE DRAWINGS

The above-described properties, features and advantages of aspects of the invention, as well as the manner in which these are achieved, become clearer and more easily understandable in association with the following description of the exemplary embodiments, which are explained in more detail in association with the drawings. Here, schematically in each case.

DETAILED DESCRIPTION OF THE PREFERRED EMBODIMENTS

Figure 1:
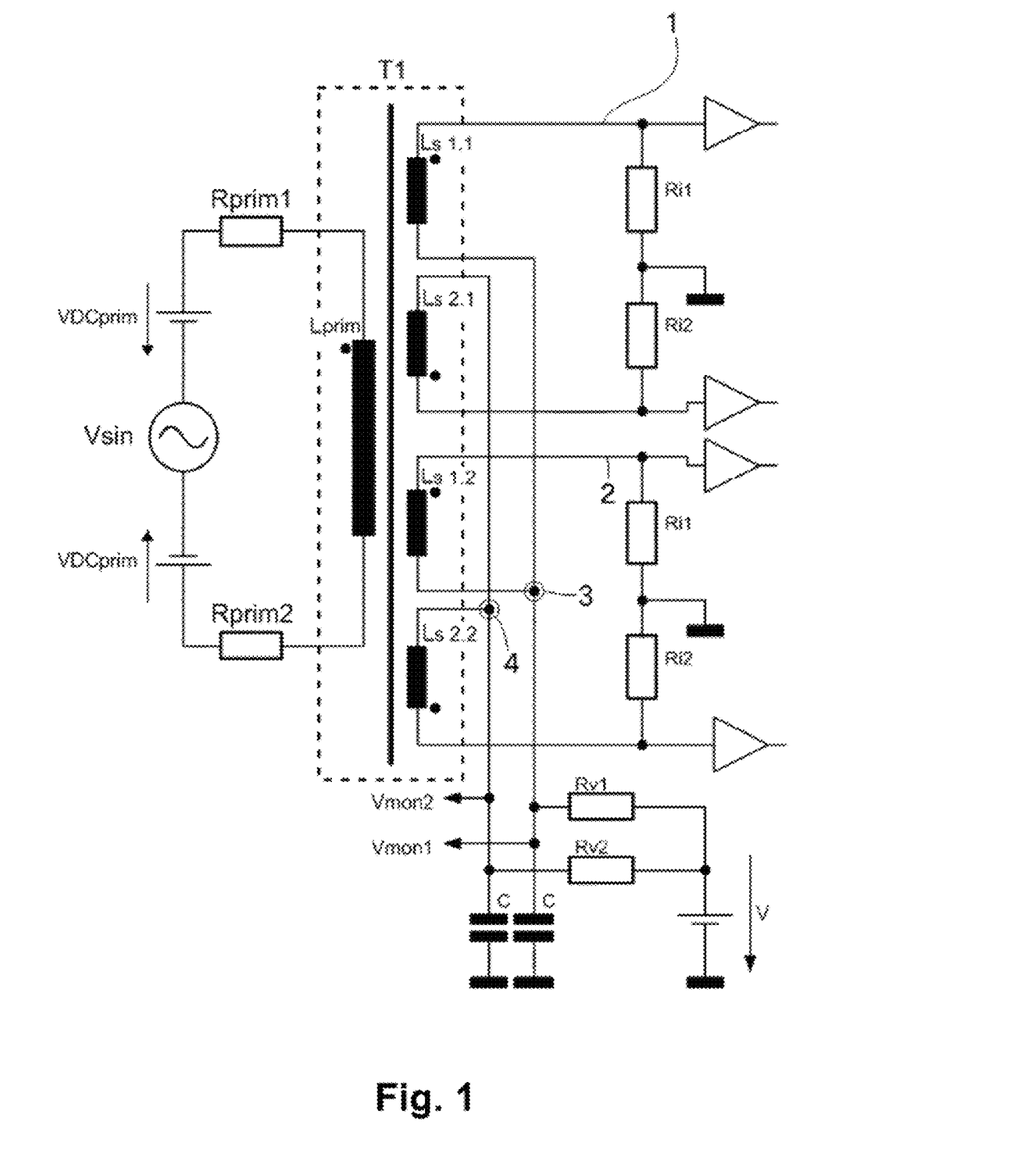
FIG. 1 shows a circuit of a transformer.

Reference is made to FIG. 1, which shows a circuit of a transformer with a primary circuit and a secondary side galvanically isolated therefrom, having two redundantly implemented secondary inductors, i.e. a total of four secondary inductors Ls1.1, Ls1.2, Ls2.1, Ls2.2. The secondary inductors Ls1.1 and Ls1.2 along with the secondary inductors Ls2.1 and Ls2.2 each here form a first path s1 and a second path s2. Inductors are referred to below as also having the same meaning as windings or winding packages. The primary inductor Lprim and the secondary inductors Ls1.1 to Ls2.2 form a transducer T1 through inductive coupling.

The primary inductor Lprim is fed by a sinusoidal voltage source of low impedance that is symmetrical or is applied at each side. Identical DC voltage sources $VDC_{prim}$ with the same potential at the two winding ends ensure that no DC current can flow through the primary winding Lprim, but the primary winding is nevertheless placed at a defined, fixed and low-impedance DC potential.

In order to be able to ascertain winding package discontinuities and galvanic connections to neighboring winding packages reliably through the evaluation of DC voltage potentials, the two separate ground base points of the secondary paths s1 and s2 are not galvanically referenced to ground, but are decoupled through capacitors C of suitable size. The capacitance value can be chosen to be small if the secondary side is loaded with high impedance and/or the signal frequencies are large, so that the reactive impedance of the capacitor C can be neglected. No change in respect of the common ground reference point then occurs for the signal frequencies in the secondary windings.

As a result of the DC voltage decoupling, a suitably dimensioned voltage divider permits the respective secondary path s1, s2 to be placed at a constant potential that represents the normal potential when no defective state is present. Significant deviations from this potential indicate the presence of a fault resulting from winding package discontinuities and galvanic connections to neighboring winding packages. The voltage dividers are formed by the parallel resistors Ri1 and the resistor Rv1 and the parallel resistors Ri2 and the resistor Rv2 respectively.

Faulty galvanic connections between the primary winding and any other secondary winding, between the secondary winding and a redundant secondary winding lying thereabove, and moreover a discontinuity in an arbitrary secondary winding, can thus be made unambiguously detectable with the aid of different source potentials assigned to the winding packages and different internal resistances of the DC voltage sources, in that the test voltages Vmon1 and Vmon2 are evaluated.

The fact that short-circuit faults can exclusively only be detected between winding packages that are not galvanically connected in regular, therefore fault-free, operation is found to be a fundamental limitation of this diagnostic method based on the comparison of DC voltage potentials. Short circuits between winding packages that are arranged within a redundant transducer path s1, s2 can accordingly not be recognized, since their winding packages are galvanically connected within a path at the common base point. This galvanic connection is indicated in FIG. 1 by the connecting node 3 as the base point of the path s1 and as the common base point of the path s2 through the connecting node 4.

If, for example with the circuit according to FIG. 1, a short circuit is created between the point indicated with reference sign 1 and the point indicated with reference sign 2—the winding packages of the path s1 are thereby (incorrectly) connected in series—the test potential Vmon1 that is responsible for indicating the fault thus cannot make the defective state known, since the DC voltage potential simply has not changed.

This fault, which initially appears unimportant, of the short circuit between winding packages within a secondary path turns out when examined more closely to be a significant fault with the same origin, because although the fault is only created in one, actually redundant, secondary path, because of the short circuit and the flow of short-circuit current resulting from it, it has an effect through the opposing inductor back to the other, fault-free signal path. In this situation the two secondary paths are no longer independent of one another, and, depending on the inductive coupling of the transformer, the fault state in one path has an effect on the path that in fact is without fault, and to a certain extent forces the signal state of the faulty path onto it. In an application of the transformer in a displacement sensor, the immediate consequence is a deviation of the sensor in both signal paths—the redundant behavior is thereby rendered ineffective—which cannot be made known with the transformer illustrated in FIG. 1. This should, however, be avoided in sensors with high safety requirements.

Figure 2:
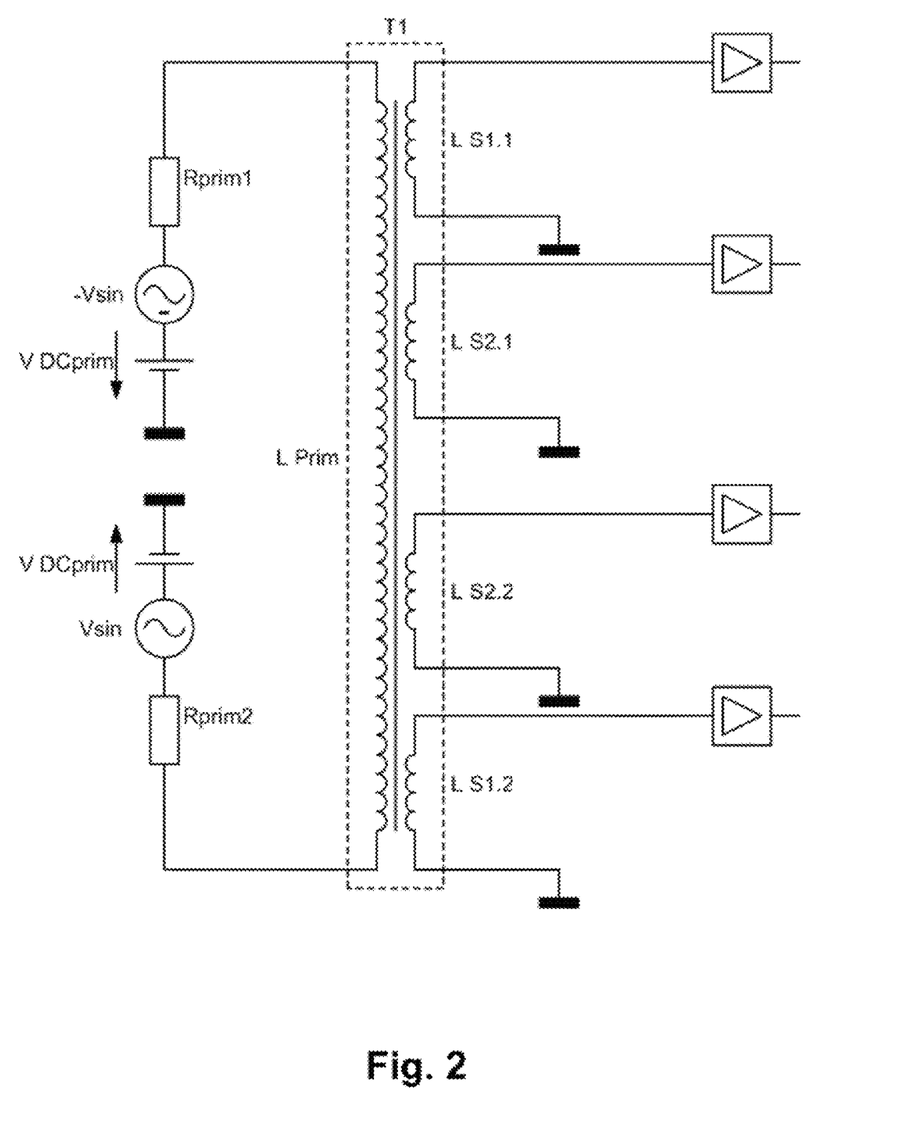
FIG. 2 shows a circuit that illustrates part of the approach according to an aspect of the invention.

In order to overcome the deficit in the diagnostic depth of the fault states explained in connection with FIG. 1, a basic approach to overcoming this is shown in FIG. 2, wherein the fundamental properties with respect to the diagnostic depth are retained. The interconnection of the transducer T1 is first changed for this purpose with respect to the implementation in FIG. 1 in such a way that the winding ends of the secondary winding packages are each made available as an individual, separate terminal. The secondary winding packages, belonging to a signal path, Ls1.1 and Ls1.2 for path s1 as well as Ls2.1 and Ls2.2 for path s2 thus now no longer share a common base point. This transducer implementation, which is appropriate for the application of an extended diagnostic method, is illustrated by FIG. 2. The discrete access to all available terminals of the secondary windings Ls1.1, Ls1.2, Ls2.1, Ls2.2 of the transducer T1 makes it possible to extend the original diagnostic method of FIG. 1 in such a way that all galvanic connections between the individual secondary windings occurring in the event of a fault can be made detectable.

Figure 3:
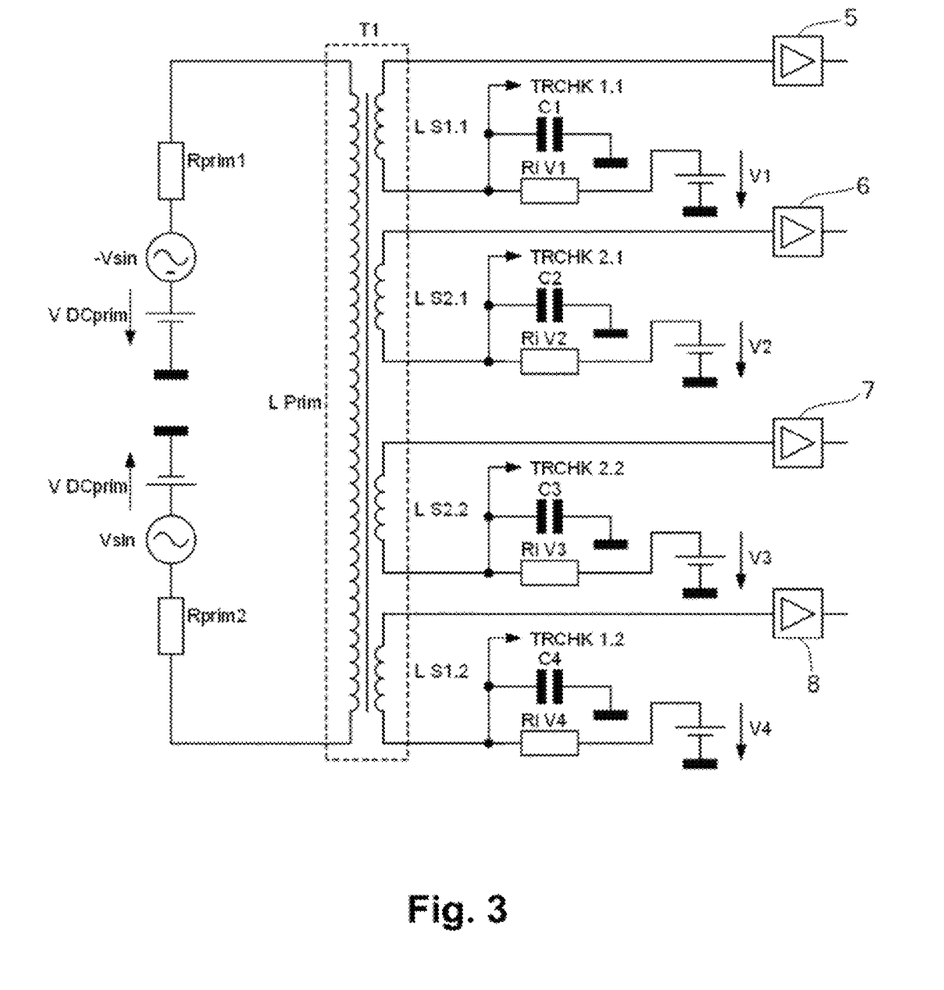
FIG. 3 shows a circuit according to the invention according to a first exemplary embodiment.

A first exemplary embodiment of a transformer according to the invention is illustrated in FIG. 3. An individual DC voltage potential from the voltage sources V1, V2, V3, V4 is thus overlaid onto the induced alternating magnitude in this case in each secondary winding Ls1.1, Ls1.2, Ls2.1, Ls2.2 of the redundant transducer T1. In addition, these individual DC voltage sources should also each have individual internal or source resistances RiV1, RiV2, RiV3, RiV4 for an unambiguous fault indication. The AC circuit for the alternating magnitudes that are likewise always to be transduced is closed by the base point capacitors C1, C2, C3, C4. The distinction between regular, fault-free operation and a fault state is made by way of the test signals TRCHK1.1, TRCHK1.2, TRCHK2.1, TRCHK2.2 that are to be evaluated, since they carry a DC voltage potential that corresponds to the operating state of the transducer T1. The fact that in this exemplary embodiment the signal source Vsin for drive of the primary winding Lprim represents a symmetric voltage source is of subsidiary significance for the function of the diagnostic method. It is, however, significant that the primary winding is at a fixed and known DC voltage potential with a defined internal resistance. This condition is satisfied here, and in the further exemplary embodiments, by the DC voltage source V_DCprim.

Figure 4:
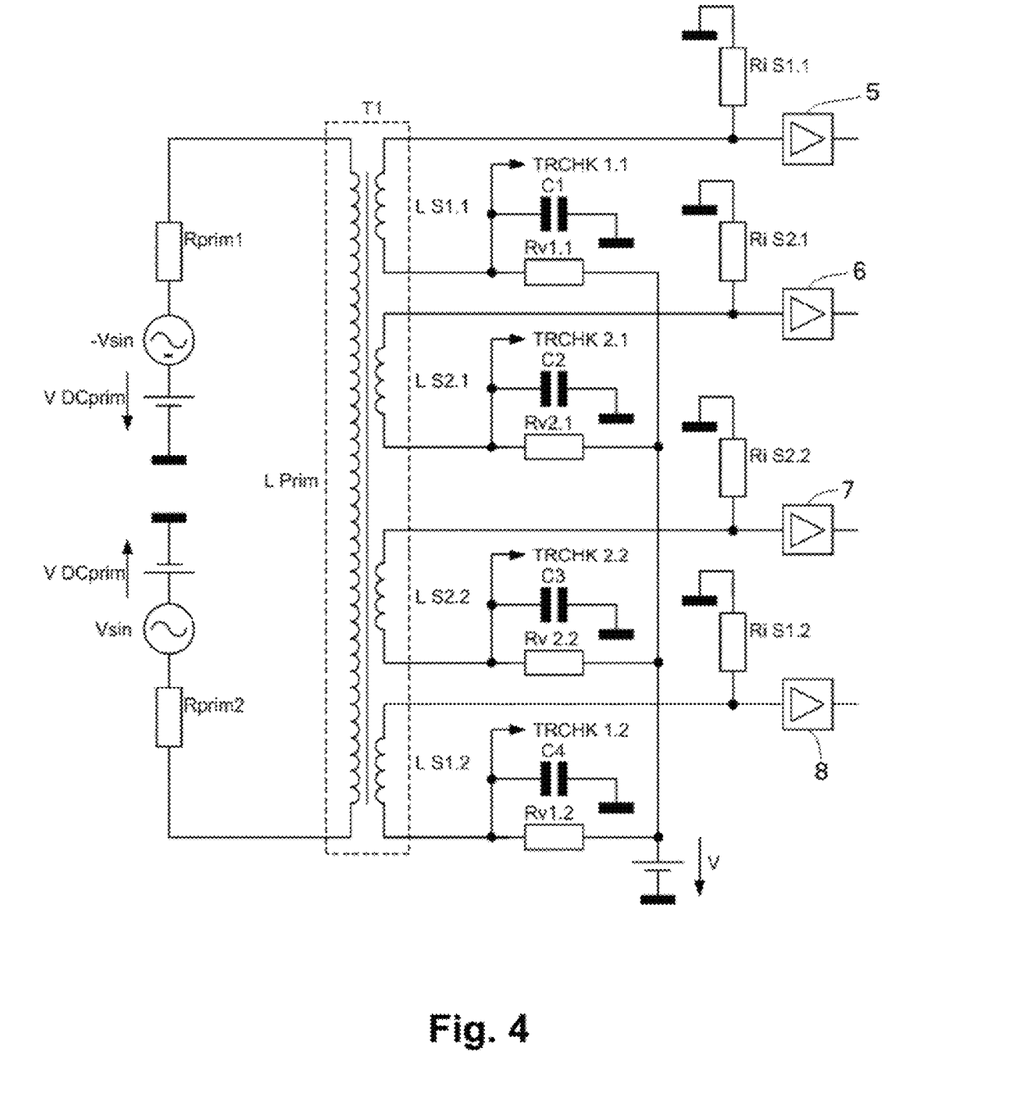
FIG. 4 shows a circuit according to the invention according to a second exemplary embodiment.

The exemplary embodiment of FIG. 4 is somewhat changed with respect to FIG. 3 from economic points of view. The individual DC voltage potentials that are required are thus not generated with individual, unique voltage sources, but are derived with the aid of voltage dividers from a common voltage source V.

For the four secondary inductors Ls1.1, Ls1.2, Ls2.1, Ls2.2 four individual base point capacitors C1, C2, C3, C4 are again provided at the respective winding end, which establish the respective alternating current ground reference point for the induced alternating magnitudes. A small value can be selected for the capacitance if the respective other end of the secondary winding is only loaded with high impedance by the resistors RiS1.1, RiS1.2, RiS2.1, RiS2.2 and the alternating current input resistances, which are each in parallel, of the alternating voltage amplifiers 5, 6, 7, 8, considered relatively in comparison to the reactive impedance of the capacitors C1 to C4. The capacitors C1 to C4 are then dimensioned such that their reactive impedance can be neglected in the chosen working frequency range of the sensor.

With the signals TRCHK1.1, TRCHK1.2, TRCHK2.1, TRCHK2.2 the comparison potentials that are significant for the test procedure are tapped via the respective voltage divider halves, and can be further processed, effectively entirely free of any residual alternating voltage, through the adequate dimensioning of the base point capacitors C1 to C4. This further processing can, for example, take place after conversion by an analog/digital converter into the digital domain, whereby a simple adjustment of the decision thresholds, stable in the long-term, in relation to distinguishing between a fault state or a state without faults (regular operation) results.

In addition to the economic advantages mentioned, the use of individually dimensioned voltage dividers also has further positive aspects:

The chosen impedance level of the voltage divider likewise determines the individual internal resistance of the source.

The chosen divider ratio determines the overlaid DC voltage potential of the respective secondary winding.

If the common voltage source V is used both as a supply source for the voltage dividers Rv1.1 to RiS1.1, Rv1.2 to RiS1.2, Rv2.1 to RiS2.1, Rv2.2 to RiS2.2 as well as a reference voltage source for the analog-to-digital converter that is performing the evaluation, then the absolute magnitude of the voltage source V is not important, since the entire system adopts a ratiometric behavior, and the potentials TRCHK1.1 to TRCHK2.2 that develop are in practice determined only by the divider ratio of the voltage dividers that develops, both in regular operation as well as in the fault state.

A diagnostic method for the detection of secondary winding package discontinuities and galvanic connections to neighboring winding packages, which provides a reliable possibility, one that is above all continuous and free of discontinuities during operation, for checking the transformer that is independent of the alternating magnitude in the transducer T1 that determines the displacement, is enabled with the exemplary embodiments of FIGS. 3 and 4. The method is moreover self-testing, since faults of any type within the extended diagnostic apparatus immediately lead to fault indications, so that as a result conditional latent faults are already securely avoided through the fundamental structure of the method.

With the voltage dividers organically integrated into the transformer circuit of FIG. 4, test signals that are individual to the secondary windings are made available through the test voltages TRCHK1.1 to TRCHK2.2; they adopt specific DC voltage potentials depending on the operating state of the transducer T1, and thereby, through the evaluation of the DC voltage potential, provide a reliable foundation for the decision as to whether the transformer is in the regular, i.e. fault-free, operating state or in a defective operating state.

In regular, fault-free operation, there are four normal potentials which emerge from the dimensioning of the voltage dividers. With reference to the fault states of the transducer T1 that can be detected with the method, three different general classes of fault can be distinguished:

Type A—galvanic connections between arbitrary secondary winding packages.

Type B—galvanic connections between arbitrary secondary winding packages and the primary winding.

Type C—electrical discontinuity of one or a plurality of secondary winding packages.

These general fault classes contain a large number of possible individual faults which are to be considered in more detail below.

If the transducer T1 of FIG. 4 is operating properly, i.e. no fault has occurred, then the potentials of the test signals TRCHK1.1 to TRCHK2.2 result in accordance with the dimensioned voltage dividers from the simple voltage divider rule. The following therefore applies:

$$TRCHK1.1 = \frac{V}{\frac{Rv1.1}{RiS1.1} + 1}$$

$$TRCHK1.2 = \frac{V}{\frac{Rv1.2}{RiS1.2} + 1}$$

$$TRCHK2.1 = \frac{V}{\frac{Rv2.1}{RiS2.1} + 1}$$

$$TRCHK2.2 = \frac{V}{\frac{Rv2.2}{RiS2.2} + 1}$$

In the fault group of type A, with galvanic connections between arbitrary secondary winding packages, six different fault states A1 to A6 can arise in the case of a transducer with a total of four independent secondary windings. These are represented in a graphically summarized manner in the DC equivalent circuits of FIG. 5.

Figure 5:
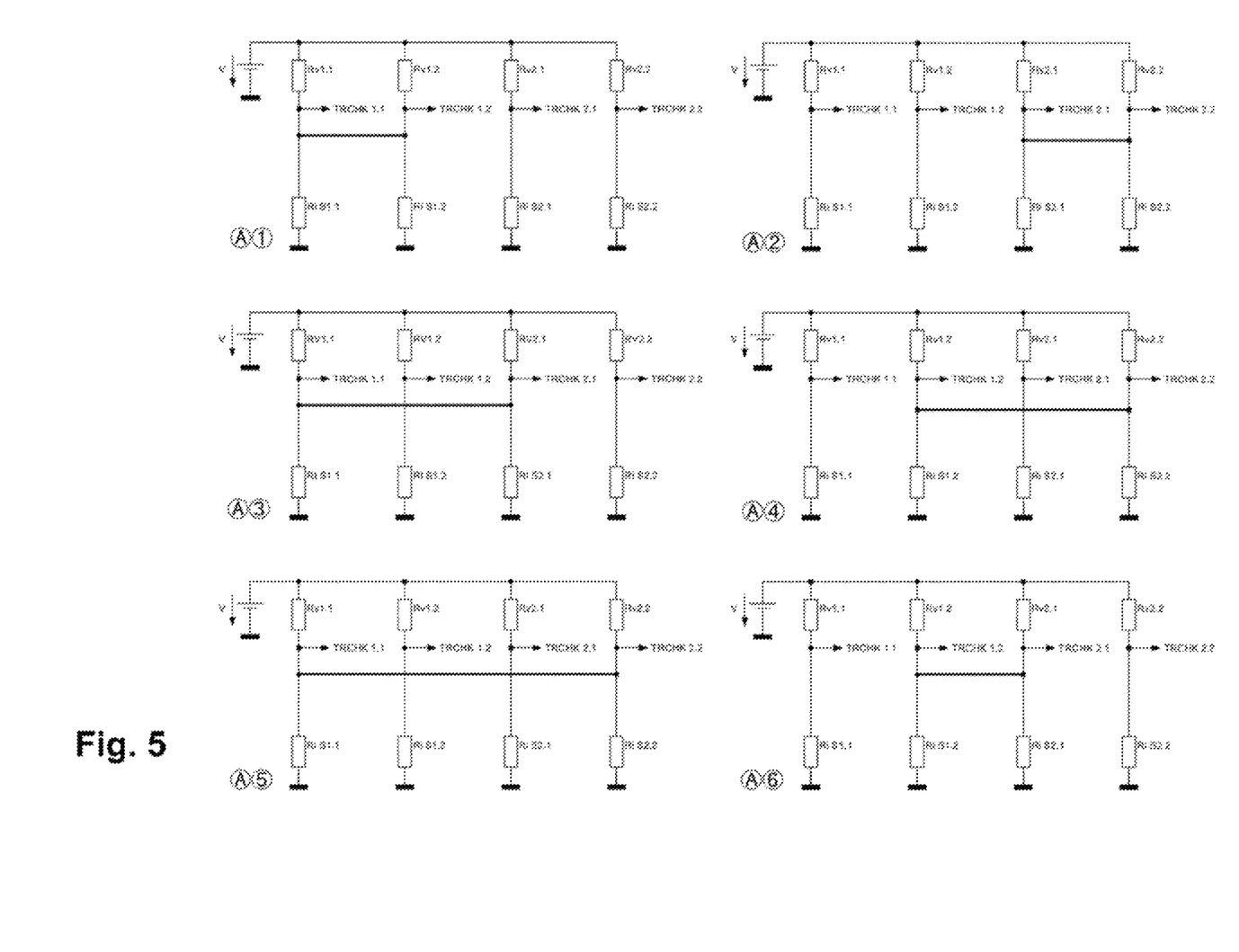
FIG. 5 shows a simplified DC voltage equivalent circuit according to the second exemplary embodiment in various defective states.

The equivalent circuit only takes into consideration the components that are significant for the DC potential at TRCHK1.1 to TRCHK2.2. The other circuit components of the transformer are omitted from this illustration. It can be seen from the equivalent circuit diagrams that the respective fault state leads in each case to a parallel interconnection of two voltage divider halves. The potentials for the TRCHK test signals, i.e. the test voltages, arising in the event of a fault can accordingly be determined taking the voltage divider halves that are connected in parallel in each case into consideration. From the simple voltage divider rule we obtain for fault state A1:

$$TRCHK1.1 = TRCHK1.2 = \frac{V}{\frac{Rv1.1 * Rv1.2}{Rv1.1 + Rv1.2}} + 1$$

for fault state A2:

$$TRCHK1.1 = TRCHK1.2 = \frac{V}{\frac{Rv2.1 * Rv2.2}{Rv2.1 + Rv2.2}} + 1$$

for fault state A3:

$$TRCHK1.1 = TRCHK1.2 = \frac{V}{\frac{Rv1.1 * Rv2.1}{Rv1.1 + Rv2.1}} + 1$$

for fault state A4:

$$TRCHK1.1 = TRCHK1.2 = \frac{V}{\frac{Rv1.2 * Rv2.2}{Rv1.2 + Rv2.2}} + 1$$
$$\frac{RiS1.2 * RiS2.2}{RiS1.2 + RiS2.2}$$

for fault state A5:

$$TRCHK1.1 = TRCHK1.2 = \frac{V}{\frac{Rv1.1 * Rv2.2}{Rv1.1 + Rv2.2}} + 1$$
$$\frac{RiS1.1 * RiS2.2}{RiS1.1 + RiS2.2}$$

for fault state A6:

$$TRCHK1.1 = TRCHK1.2 = \frac{V}{\frac{Rv2.1 * Rv1.2}{Rv2.1 + Rv1.2}} + 1$$
$$\frac{RiS2.1 * RiS1.2}{RiS2.1 + RiS1.2}$$

Figure 6:
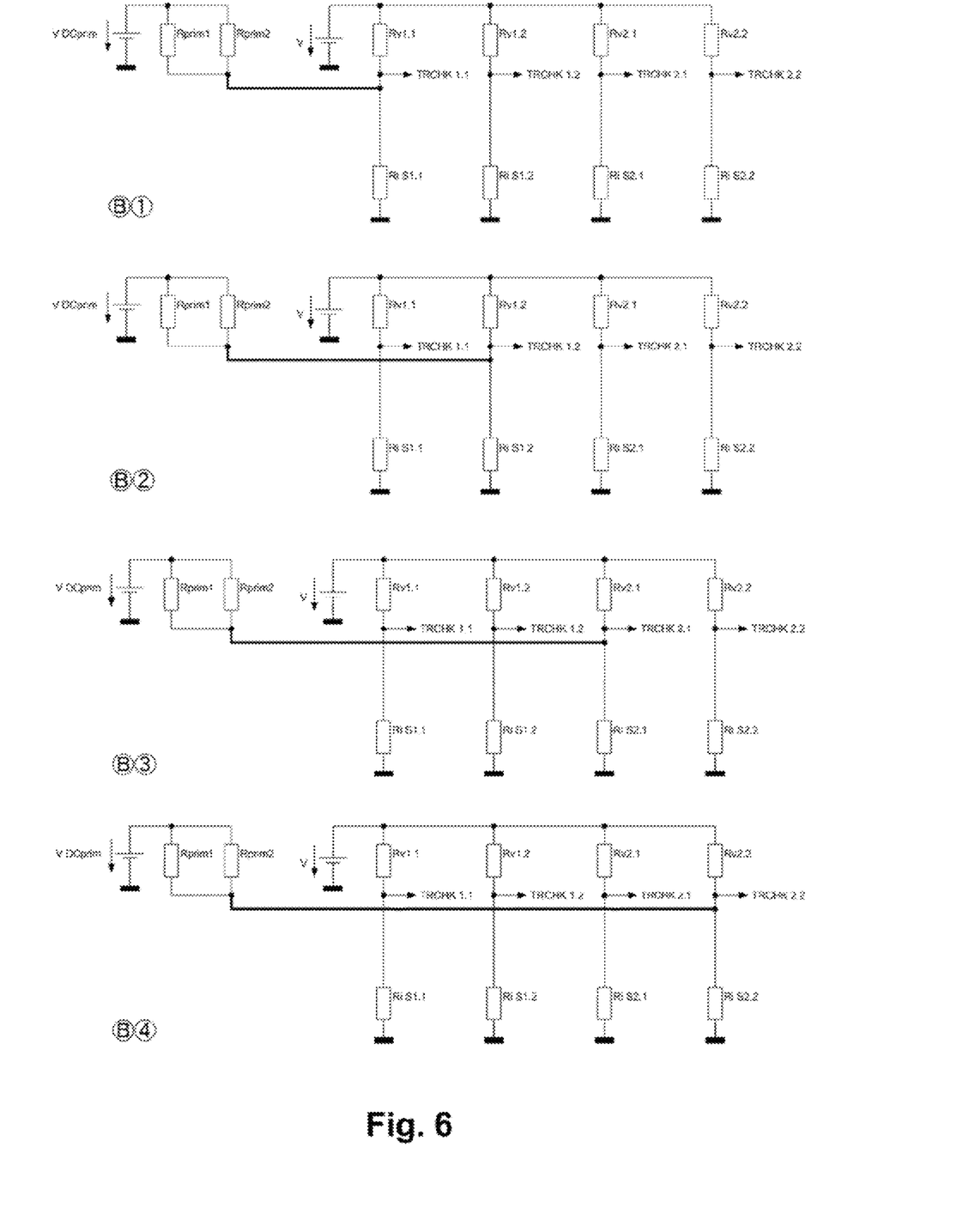
FIG. 6 shows a simplified DC voltage equivalent circuit according to the second exemplary embodiment in further various defective states.

In the fault group of type B, which groups together galvanic connections between arbitrary secondary windings and the primary winding, four individual fault states B1 to B4 result. Simplified DC equivalent circuits can also be derived here, which are illustrated in FIG. 6.

Figure 7:
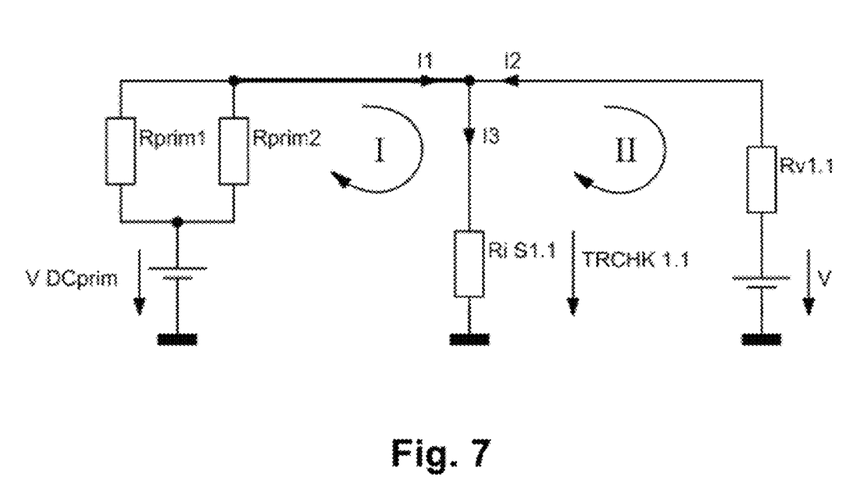
FIG. 7 shows a simplified DC voltage equivalent circuit according to the second exemplary embodiment in one of the defective states of FIG. 6.

The electrical network arising for the respective fault states is illustrated again in a different form in FIG. 7, taking the fault state B1, in which the secondary winding Ls1.1 is galvanically connected to the primary winding Lprim, as an example. The voltage that develops in the event of a fault at TRCHK1.1—this test signal only changes in the case of this fault state—can easily be ascertained through the corresponding node and mesh equations, as illustrated in FIG. 7.

The following results from the node and mesh equations for B1:

$$0 = I1 + I2 - I3$$
$$0 = I1 * \frac{Rprim1 * Rprim2}{Rprim1 + Rprim2} + I3 * RiS1.1 - VDCprim$$
$$0 = -I2 * Rv1.1 - I3 * RiS1.1 + V$$

With TRCHK1.1=I3*RiS1.1 we obtain, after solving the equation system, the explicit representation for the test signal TRCHK1.1 of the fault state B1:

$$TRCHK1.1 = RiS1.1 * \frac{V * \frac{Rprim1 * Rprim2}{Rprim1 + Rprim2} + VDCprim}{(Rv1.1 + RiS1.1) * \frac{Rprim1 * Rprim2}{Rprim1 + Rprim2} + RiS1.1}$$

The other three determining equations for TRCHK1.2 for fault state B2, TRCHK2.1 for fault state B3, and TRCHK2.2 for fault state B4 can be ascertained in a manner analogous to the above procedure.

Figure 8:
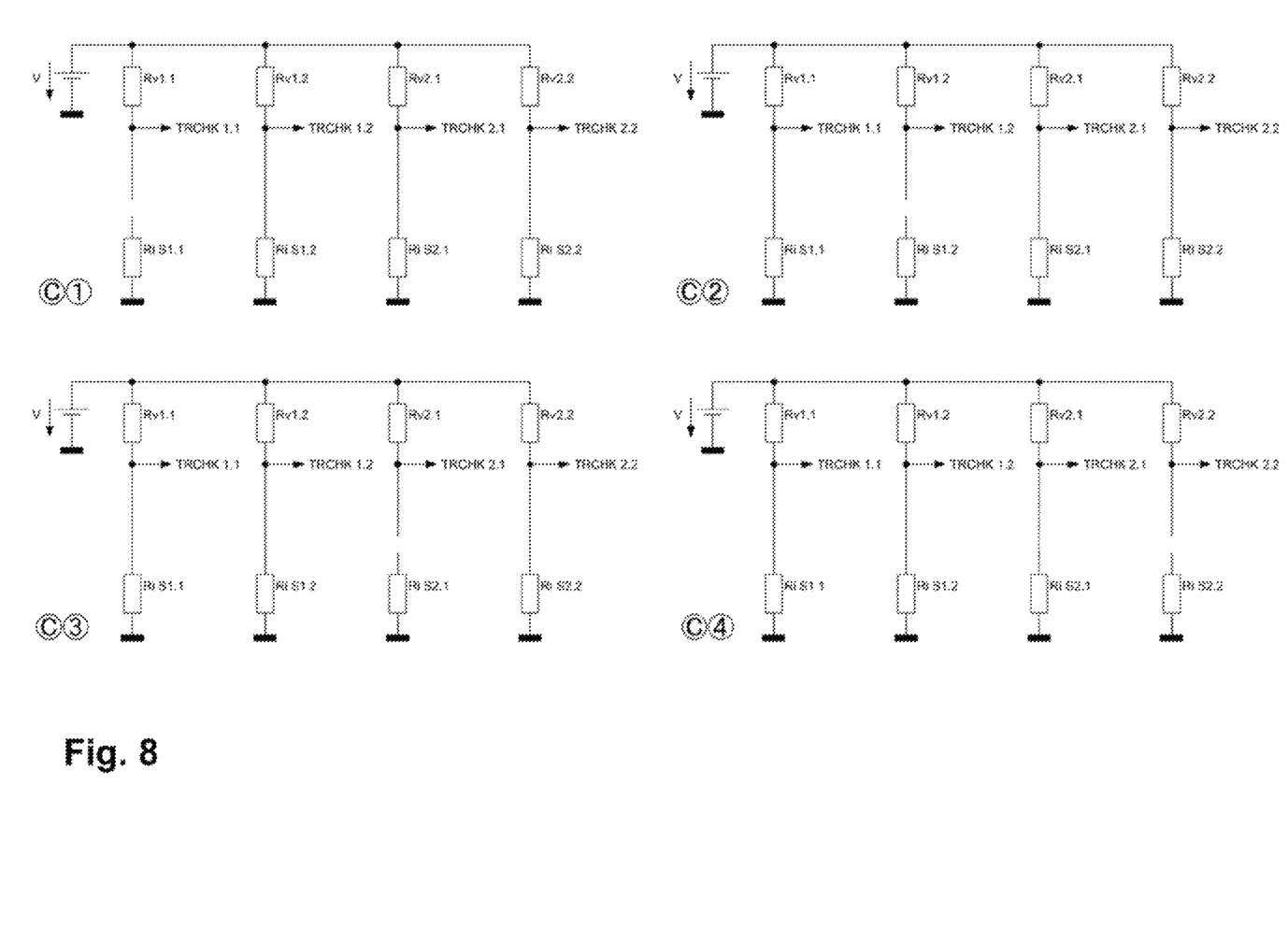
FIG. 8 shows a simplified DC voltage equivalent circuit according to the second exemplary embodiment in further various defective states.

The fault group of type C is characterized by discontinuities in any secondary windings, wherein, due to the independence of the voltage dividers, multiple fault states of this fault group can also occur simultaneously without the diagnostic capability being impaired. It can be seen from the DC equivalent circuits in FIG. 8 with the fault states C1 to C4 that in the event of a fault caused by discontinuity in the winding, the respective voltage divider is also disconnected, and accordingly the respective test signal TRCHK has the complete potential of the voltage source V. The following therefore applies for fault state C1:
TRCHK1.1=V
for fault state C2:
TRCHK1.2=V
for fault state C3:
TRCHK2.1=V
for fault state C4:
TRCHK2.2=V According to a further exemplary embodiment that is not illustrated in any of the figures, the resistors RiS1.1 and RiS2.2 are connected to the common voltage source, while the resistors Rv1.1 and Rv2.2 are connected to ground potential. As a result of this implementation, with resistance values Ri that in this example are fixedly predetermined, an optimum in relation to the potential difference between regular fault-free operation and the fault state is obtained, in particular in the case of galvanic connections between the secondary windings, i.e. faults of type A. This is due to the fact that, in particular in the case of fault states of fault group A, both a favorably selected voltage divider idle potential (TRCHK1.1 to TRCHK2.2), as well as the impedance level ratio of the voltage dividers to one another, determines the resulting potential difference between regular fault-free operation and the fault state.

When dimensioning the electrical components, their tolerances are to be taken into consideration. The fundamental aim of the most advantageous possible dimensioning of the transformer or of the test circuits is that of obtaining the largest, most meaningful possible distance for at least one of the test voltages TRCHK1.1 to TRCHK2.2 over all of the fault states and beyond.

Figure 9:
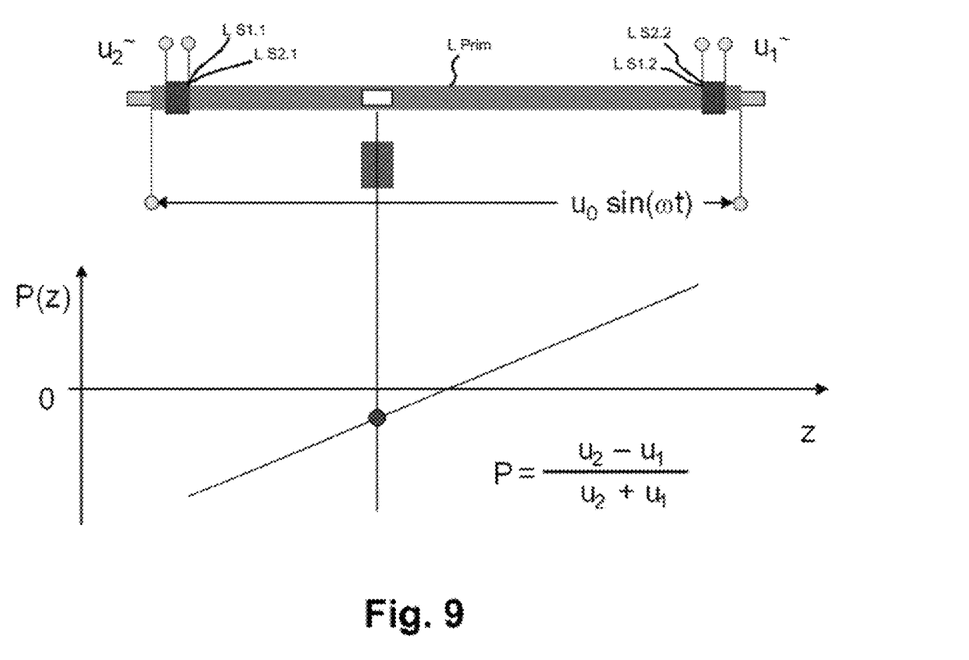
FIG. 9 shows a highly schematic illustration of an exemplary embodiment of a sensor according to the invention.

A sensor according to an aspect of the invention, having a transformer as previously described, is illustrated in a highly schematic form in FIG. 9. The primary inductor Lprim is wound continuously over a soft-magnetic core, at the ends of which the secondary inductors Ls1.1, Ls1.2 are wound, along with the secondary inductors Ls2.1, Ls2.2, that for safety reasons are redundant to the first two. An encoder whose distance traveled is measured with the sensor is formed as a permanent magnet, and drives the soft-magnetic core locally into a magnetic saturation. This influences the coupling between the primary inductor Lprim and the secondary inductors Ls1.1, Ls1.2, Ls2.1, Ls2.2, so that the distance covered by the encoder can be derived therefrom.

Provided that an adequately large minimum potential distance between regular, fault-free operation and an arbitrary fault state, taking the tolerances involved into consideration, results from the dimensioning, an extremely robust operating mode of the transformer can be assumed in the case of which the risk of an incorrect diagnosis is almost entirely ruled out.

In particular when the transformer is used in sensors for applications with very high safety requirements, a detection of a fault state should be performed not only reliably, but also quickly. As a result of the RC networks used in the described circuits of the transformer, the transition from the regular, fault-free state into a fault state leads to electrical balancing processes that lead to a display delay time of the fault state depending on the effective time constants of the individual network. It has, however, been shown in tests that even the longest time span that occurs is sufficiently small that the diagnosis that can be carried out with the transformer is also suitable for the display of faults in extremely fast-reacting applications.

The invention claimed is:

1. A transformer, comprising:
   a primary circuit with a primary inductor,
   a first secondary circuit with a first secondary inductor that is galvanically isolated from the primary inductor and coupled to the primary inductor, and
   a second secondary circuit with a second secondary inductor that is galvanically isolated from the primary inductor and coupled to the primary inductor, wherein the second secondary inductor is implemented redundantly with respect to the first secondary inductor, such that the first secondary inductor is wound upon the second secondary inductor or the second secondary inductor is wound upon the first secondary inductor,
   wherein the first and second secondary inductors are connected to one, or each to one, DC voltage source as well as each to a test circuit with a tapping point for tapping off a test voltage.

2. The transformer as claimed in claim 1, wherein the respective test circuit comprises two resistors between which the tapping point is arranged, so that the resistors form a voltage divider, wherein the respective secondary inductor is connected in series between the two resistors.

3. The transformer as claimed in claim 2, wherein the resistors are dimensioned such that the division ratios of the respective voltage dividers are different.

4. The transformer as claimed in claim 1, further comprising a third secondary circuit with a third secondary inductor that is galvanically isolated from the primary inductor and coupled to the primary inductor, a fourth secondary circuit with a fourth secondary inductor that is galvanically isolated from the primary inductor and coupled to the primary inductor, wherein the fourth secondary inductor is implemented redundantly with respect to the third secondary inductor, such that the third secondary inductor encloses the fourth or the fourth encloses the third,
   wherein the third and fourth secondary inductors are each connected to a DC voltage source or to the DC voltage source of the first and second secondary inductors, as well as each to a test circuit with a tapping point for tapping off a test voltage.

5. The transformer as claimed claim 1, wherein the secondary inductors each comprise their own ground connection and each comprise a galvanic isolation from the ground connection, in the form of a capacitor.

6. The transformer as claimed in claim 1, wherein the primary circuit comprises a DC voltage source, so that a specific DC voltage potential can be applied to the primary inductor.

7. The transformer as claimed in claim 1, wherein the electrical components of the test circuits are dimensioned such that in the case of different defective states, including short circuits between different combinations of components, the size of the difference between the test voltage in the fault-free state and the test voltage in the case of a particular one of the various defective states is as large as possible in each case for at least one of the test voltages, taking into account the respective maximum component tolerances.

8. The transformer as claimed in claim 1, further comprising an analysis apparatus for further processing of the test voltages that is attached to the respective tapping points, wherein the analysis apparatus is configured to compare the respective test voltage with at least one threshold voltage and, depending thereon, to output information as to whether the transformer has a defective state, also as to what type of defective state is involved.

9. The transformer as claimed in claim 8, wherein the tapping points are connected to the analysis apparatus through an analog/digital converter in each case.

10. The transformer as claimed in claim 9, wherein the respective analog/digital converters are connected to the common DC voltage source of the secondary inductors as the reference voltage source.

11. A sensor comprising a transformer as claimed in claim 1, wherein the sensor is designed to register the distance covered by an encoder on the basis of a coupling between the primary inductor and the secondary inductors, wherein the encoder influences the coupling depending on the distance, as a result of local saturation of a soft-magnetic core.

* * * * *